(12) United States Patent
Lin et al.

(10) Patent No.: US 11,095,672 B2
(45) Date of Patent: Aug. 17, 2021

(54) METHOD FOR EVALUATING DOMAIN NAME AND SERVER USING THE SAME

(71) Applicant: Acer Cyber Security Incorporated, Taipei (TW)

(72) Inventors: Pin-Cyuan Lin, New Taipei (TW); Jun-Mein Wu, New Taipei (TW); Yu-Chun Wu, New Taipei (TW); Ming-Kung Sun, Taipei (TW); Zong-Cyuan Jhang, Taipei (TW); Yi-Chung Tseng, Taipei (TW); Chiung-Ying Huang, Taipei (TW)

(73) Assignee: Acer Cyber Security Incorporated, Taipei (TW)

( * ) Notice: Subject to any disclaimer, the term of this patent is extended or adjusted under 35 U.S.C. 154(b) by 261 days.

(21) Appl. No.: 16/242,013

(22) Filed: Jan. 8, 2019

(65) Prior Publication Data

US 2020/0112575 A1    Apr. 9, 2020

(30) Foreign Application Priority Data

Oct. 4, 2018  (TW) .................................. 107135011

(51) Int. Cl.
*H04L 29/06* (2006.01)
*G06N 20/00* (2019.01)
*G06F 40/126* (2020.01)
*G06K 9/62* (2006.01)
(Continued)

(52) U.S. Cl.
CPC ........ *H04L 63/1425* (2013.01); *G06F 40/126* (2020.01); *G06K 9/6217* (2013.01); *G06N 3/08* (2013.01); *G06N 20/00* (2019.01); *H04L 61/1511* (2013.01); *H04L 63/1416* (2013.01); *H04L 2463/144* (2013.01)

(58) Field of Classification Search
CPC ........................... G06N 20/00; H04L 63/1425
USPC ..................................................... 726/22–25
See application file for complete search history.

(56) References Cited

U.S. PATENT DOCUMENTS

2010/0246809 A1* 9/2010 Noda .................... H04L 9/0637
380/28
2020/0107072 A1* 4/2020 Lomada .................. G06N 3/08

FOREIGN PATENT DOCUMENTS

| CA | 3000166 | 10/2018 |
|----|---------|---------|
| CN | 108494746 | 9/2018 |
| CN | 108600200 | 9/2018 |

(Continued)

OTHER PUBLICATIONS

Jonathan Woodbridge, et al, "Predicting Domain Generation Algorithms with Long Short-Term Memory Networks", Computer Science, Nov. 2, 2016, pp. 1-13.

*Primary Examiner* — Anthony D Brown
(74) *Attorney, Agent, or Firm* — JCIPRNET

(57) ABSTRACT

The disclosure provides a method for evaluating domain name and a server using the same method. The method includes: retrieving a raw domain name and dividing the raw domain name into a plurality of parts; retrieving a specific part of the parts, wherein the specific part include characters; encoding the characters into encoded data; padding the encoded data to a specific length; projecting the encoded data being padded as embedded vectors; sequentially inputting the embedded vectors to a plurality cells of a long short term memory model to generate a result vector; and converting the result vector to a prediction probability via a fully-connected layer and a specific function.

16 Claims, 9 Drawing Sheets

(51) Int. Cl.
*G06N 3/08* (2006.01)
*H04L 29/12* (2006.01)

(56) References Cited

FOREIGN PATENT DOCUMENTS

| | | |
|---|---|---|
| TW | 201822505 | 6/2018 |
| WO | 2017193036 | 11/2017 |

* cited by examiner

METHOD FOR EVALUATING DOMAIN NAME AND SERVER USING THE SAME

CROSS-REFERENCE TO RELATED APPLICATION

This application claims the priority benefit of Taiwan application serial no. 107135011, filed on Oct. 4, 2018. The entirety of the above-mentioned patent application is hereby incorporated by reference herein and made a part of this specification.

BACKGROUND

Technical Field

The present disclosure relates to a method for evaluating a domain name and a server using the same method, and in particular to a method for evaluating a probability about whether a domain name is generated via a Domain Generation Algorithm (DGA) and a server using the same method.

Description of Related Art

When a hacker intends to attack certain devices, the hacker will attempt various possible ways to implant a virus (e.g., a Bot virus) into the victim's device, thereby infecting the victim's device. When a hacker is capable of controlling multiple infected devices, a botnet can be accordingly formed and used to attack the target when needed (for example, a distributed denial-of-service (DDos) attack). During the incubation phase, the Bot virus needs to stay connected with the Command and Control (C2) server to update the latest version of the instructions, such that the hacker may accurately manage the number and status of the Bot virus. To increase the successful reporting rate of Bot virus while avoiding the exact IP location of the C2 server to be revealed, the hacker will use DGA to dynamically generate the domain name for communications, so that the Bot virus can repeatedly try to connect with the C2 server via legitimate domain name system (DNS) service to increase the lifetime of the overall botnet.

Today, DNS has become a crucial service for the Internet, so most organizations or users do not pay special attention to the traffic and content of DNS queries. Domain-flux addresses this vulnerability by continuously connecting with the domain name generated by the DGA when the Bot cannot connect to the default server. Therefore, as long as the hacker successfully registers one of the domain names, the Bot must be able to connect to the C2 server eventually.

Because the DGA algorithm can generate a large number of domain names in a short period of time, the traditional blacklist mechanism based on the domain name as the blocking mechanism has failed. Even the relevant network administrators can still guess through some subtle clues as to which domain names may be generated by the DGA (for example, the domain name is mostly meaningless strings, overly long domain names, etc.), since DNS traffic is usually large, it is difficult to check them one by one. Moreover, there are many types of DGAs, and some of them have hidden features that are difficult to distinguish with human eyes.

SUMMARY

In view of this, the method for evaluating a domain name and the server using the same method proposed by the present disclosure can be used to predict the probability that the input raw domain name is generated by the DGA algorithm, and thus those networks that are suspicious can be discovered in an early stage.

The present disclosure provides a method of evaluating a domain name. The method includes: retrieving a raw domain name and dividing the raw domain name into a plurality of parts; retrieving a specific part of the parts, wherein the specific part includes at least one character; encoding the at least one character into at least one encoded data; padding the at least one encoded data to a specific length; projecting the encoded data being padded to a plurality of embedded vectors, wherein the at least one encoded data being padded one-to-one corresponds to the embedded vectors; sequentially inputting the embedded vectors to a plurality of cells of a long short term memory model to generate a result vector; and converting the resulting vector to a prediction probability via a fully-connected layer and a specific function.

The disclosure provides a server comprising a storage circuit and a processor. The storage circuit stores a plurality of modules. The processor is coupled to the storage circuit, and accesses the foregoing module to perform the following steps: retrieving a raw domain name and dividing the raw domain name into a plurality of parts; retrieving a specific part of the parts, wherein the specific part includes at least one character; encoding the at least one character into at least one encoded data; padding the at least one encoded data to a specific length; projecting the encoded data being padded to a plurality of embedded vectors, wherein the at least one encoded data being padded one-to-one corresponds to the embedded vectors; sequentially inputting the embedded vectors to a plurality of cells of a long short term memory model to generate a result vector; and converting the resulting vector to a prediction probability via a fully-connected layer and a specific function.

Based on the above, the method for evaluating the domain name and the server using the same method proposed by the present disclosure can use the trained Long Short Term Memory (LSTM) model to identify which domain name may be generated by DGA, so that the related administrators can take appropriate precautions as soon as possible.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Roughly speaking, the method proposed by the present disclosure can firstly train the LSTM model with a large amount of training data based on the deep learning technology, and then input the unknown domain name to the LSTM model, such that the LSTM model can be utilized to predict the probability that this unknown domain name is generated by the DGA.

Figure 1:
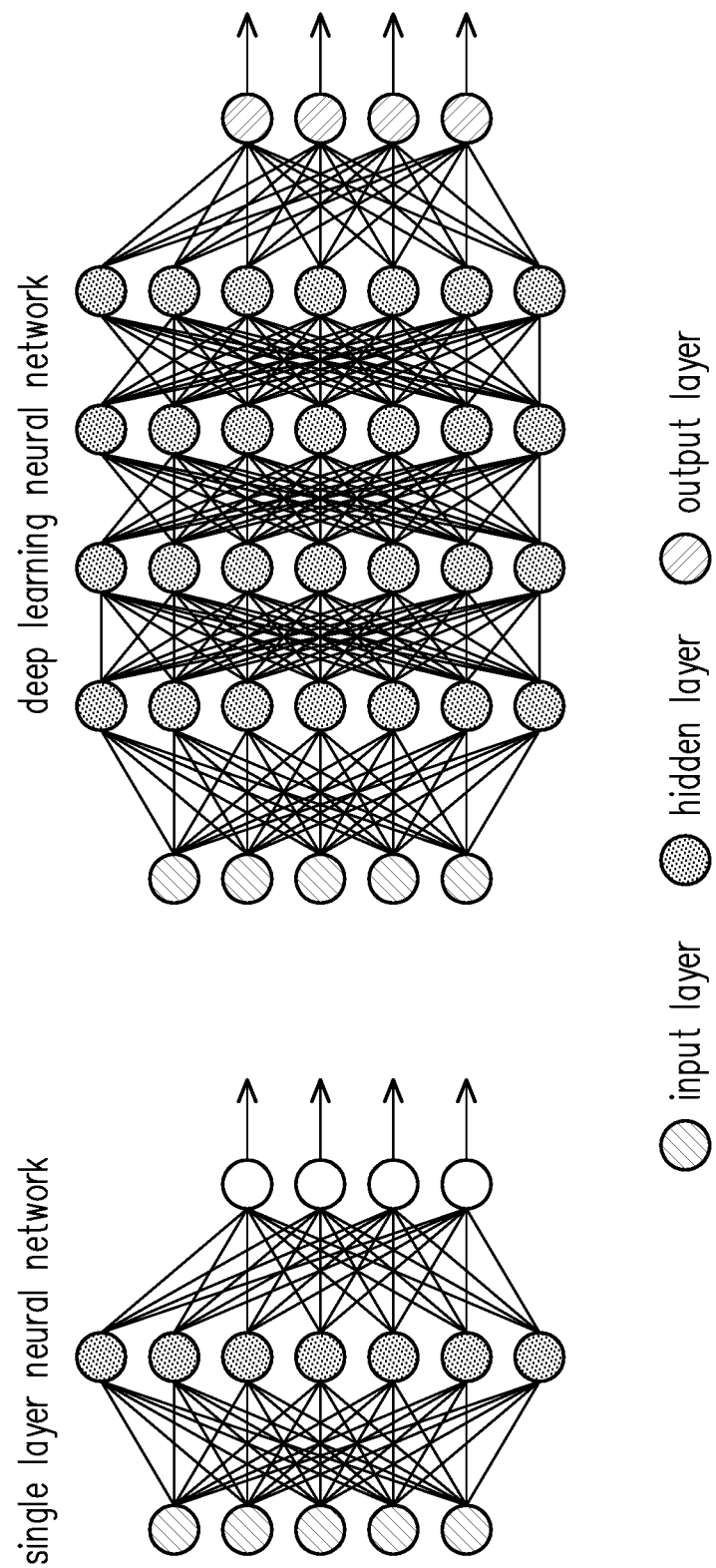
FIG. 1 is a schematic diagram of a neural network and a deep learning neural network.

Deep learning is one of the branches of machine learning, which is constructed by a multi-layer neural network. Please refer to FIG. 1, which is a schematic diagram of a neural network and a deep learning neural network. As shown in FIG. 1, the above-mentioned neural network is a mathematical model that simulates the biological nervous system, which usually has several layers, and each layer contains a plurality of neurons. Each neuron firstly multiplies the input value of the previous neuron by the weight and adds them up, and after the conversion of the activation function, it outputs to the next layer. The goal of the entire neural network training process is to find the best weight setting, so that the output results may approach the optimization goal. By linear or non-linear transformation of data through multiple layers, features that can represent data characteristics can be automatically extracted. Therefore, as long as the architecture and parameters are set properly, the feature extraction capability of the neural network can not only save the time spent by experts on feature extracting engineering, but also can achieve satisfying performance in those applications where the machine learning has not been able to break through. Therefore, it has become one of the most popular research fields today.

Figure 2:
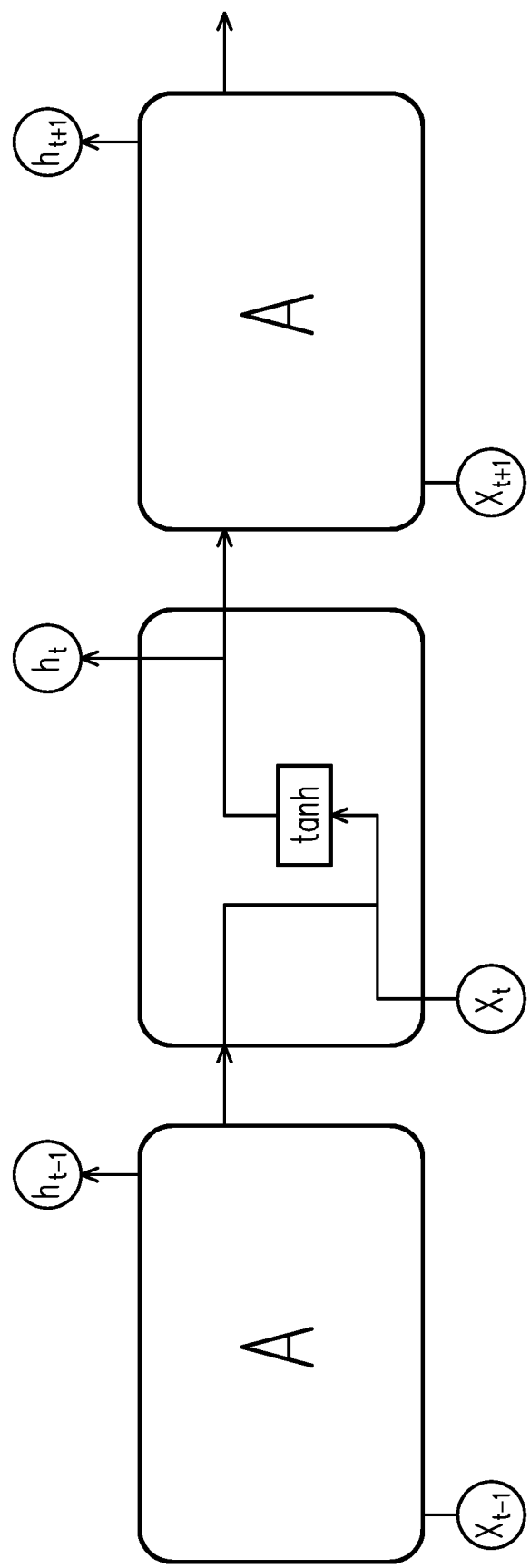
FIG. 2 is a schematic diagram of Recurrent Neural Networks (RNN).

Please refer to FIG. 2, which is a schematic diagram of Recurrent Neural Networks (RNN). Unlike the general neural networks, the RNN shown in FIG. 2 is a neural network that is capable of memorizing. Specifically, in a general neural network, the information of a neuron can only be completely contributed by the currently input data. However, in addition to connecting the neuron with the currently input data, the RNN is also connected to the past neurons, so that the neurons can conserve the previous memory.

However, as the length of the past network connected with the traditional RNN grows, the gradient of the backpropagation becomes smaller, which leads to the gradient vanish problem and deteriorating the learning effects. Therefore, traditional RNNs have difficulty learning memories that are too long before, and the LSTM model can be used to solve this problem.

Figure 3:
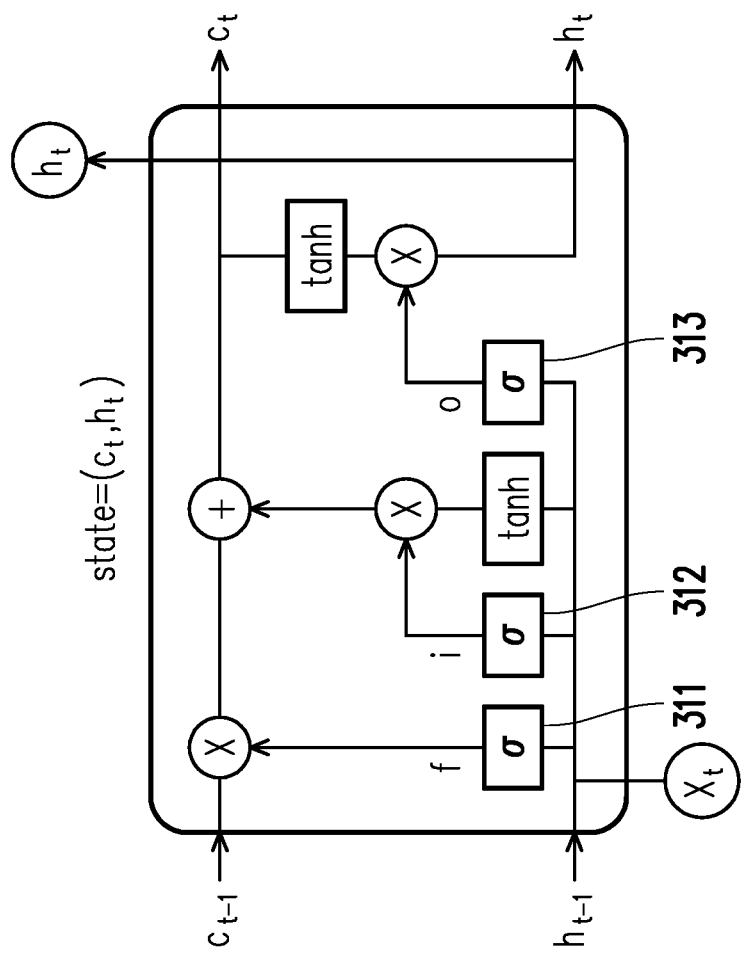
FIG. 3 is a schematic diagram of an LSTM model cell according to an embodiment of the disclosure.

Please refer to FIG. 3, which is a schematic diagram of an LSTM model cell according to an embodiment of the disclosure. As shown in FIG. 3, there is one memory area in the cells of the LSTM model, which can be formed by a plurality of serially connected cells. Different from the traditional RNN with full input full output mode, the LSTM model cell controls the update and output of the memory area by three gates. The foregoing three gates include: (1) a forget gate 311: determining how much memory of the previous cell is to be transferred to the memory area of the next cell; (2) input gate 312: determining how much new information may enter the memory area (including the currently entered $X_t$ and the previously outputted $h_{t-1}$); and (3) the output gate 313: determining how much of the updated memory is to be output to the next cell.

Based on the above, the present disclosure utilizes a large amount of training data (for example, a domain name known to be generated by DGA) to train the LSTM model, so that the LSTM model can automatically learn the valid feature the can be used to identify the domain names generated via DGA from the above training data. After the training is completed, when the LSTM model receives the unknown domain name, it can predict the probability that the unknown domain name is generated by the DGA by extracting the features. Detailed descriptions will be discussed in the following.

Figure 4:
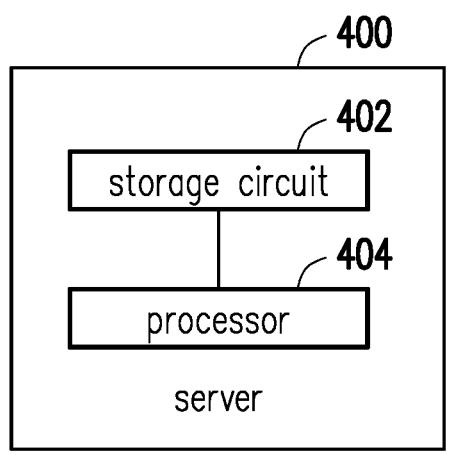
FIG. 4 is a functional block diagram of a server according to an embodiment of the disclosure.

Please refer to FIG. 4, which is a functional block diagram of a server according to an embodiment of the disclosure. In this embodiment, the server 400 can be deployed, for example, in a company, and can be used to enable the related network administrator to monitor the network logs of multiple computers in the company. For example, when the computer is connected to a website, the server 400 can record the domain name of the website in a log, and the domain name can be inputted to the trained LSTM model as the raw domain name for identification, but the present disclosure is not limited thereto.

The server 400 includes a storage circuit 420 and a processor 404. The storage circuit 402 is, for example, a memory, a hard disk, or any other component that can be used to store data, and can be used to record a plurality of code or modules. The processor 404 is coupled to the storage circuit 402 and can be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like.

Figure 5:
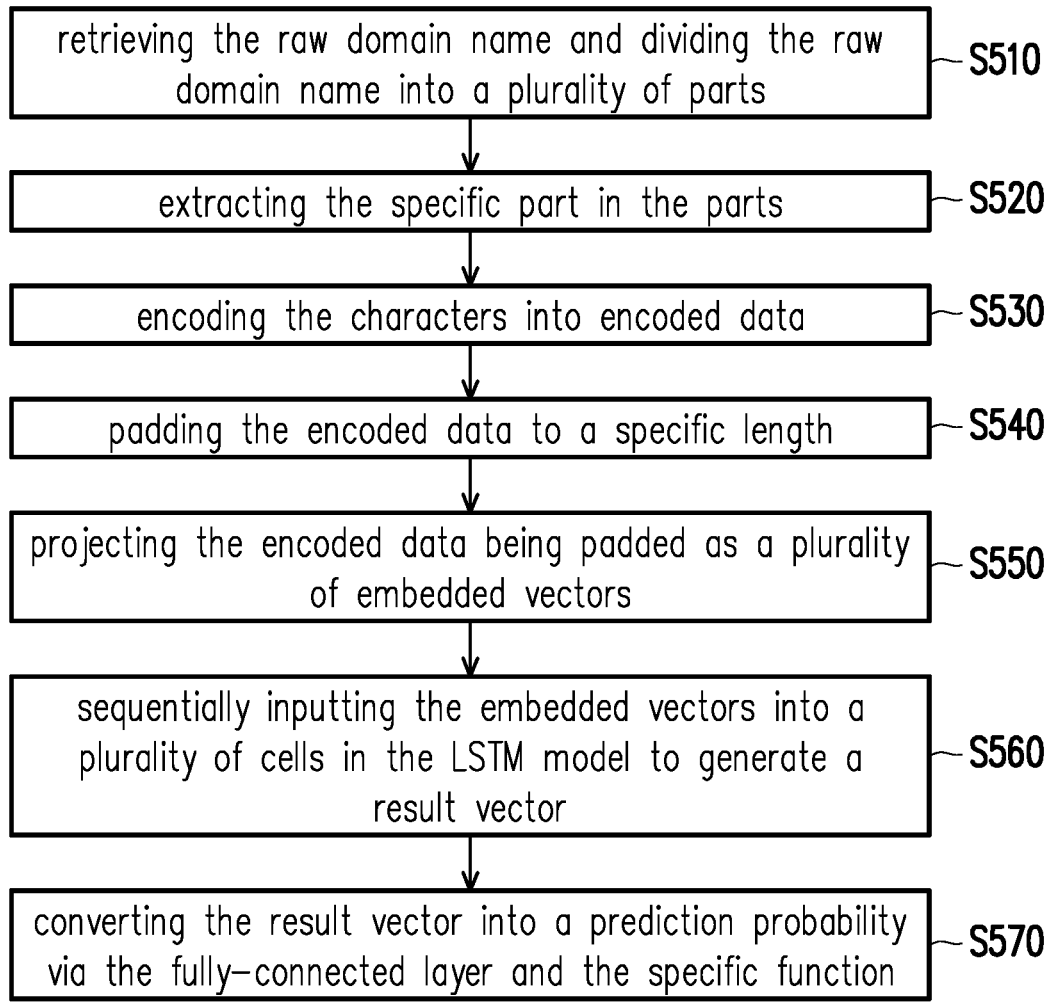
FIG. 5 is a flowchart of a method for evaluating a domain name according to an embodiment of the present disclosure.

Please refer to FIG. 5, which is a flowchart of a method for evaluating a domain name according to an embodiment of the present disclosure. The method of FIG. 5 can be performed by the server 400 of FIG. 4, and the details of the steps of FIG. 5 will be described below with reference to the elements of FIG. 4.

Firstly, in step S510, the processor 404 can retrieve the raw domain name and divide the raw domain name into a plurality of parts. In an embodiment, the foregoing part may be a sub-level domain name, a generic top-level domain name (gTLD name), a country code top-level domain name, ccTLD name), and specific parts. In other words, the above specific part is the remaining parts of the raw domain name except the sub-level domain name, gTLD, and ccTLD.

Since the sub-level domain name, the gTLD, and the ccTLD are also included in the normal domain name, which does not facilitate the subsequent identification operation, the processor 404 can extract the specific part in step S520 to improve the efficiency of subsequent identification.

Figure 6:
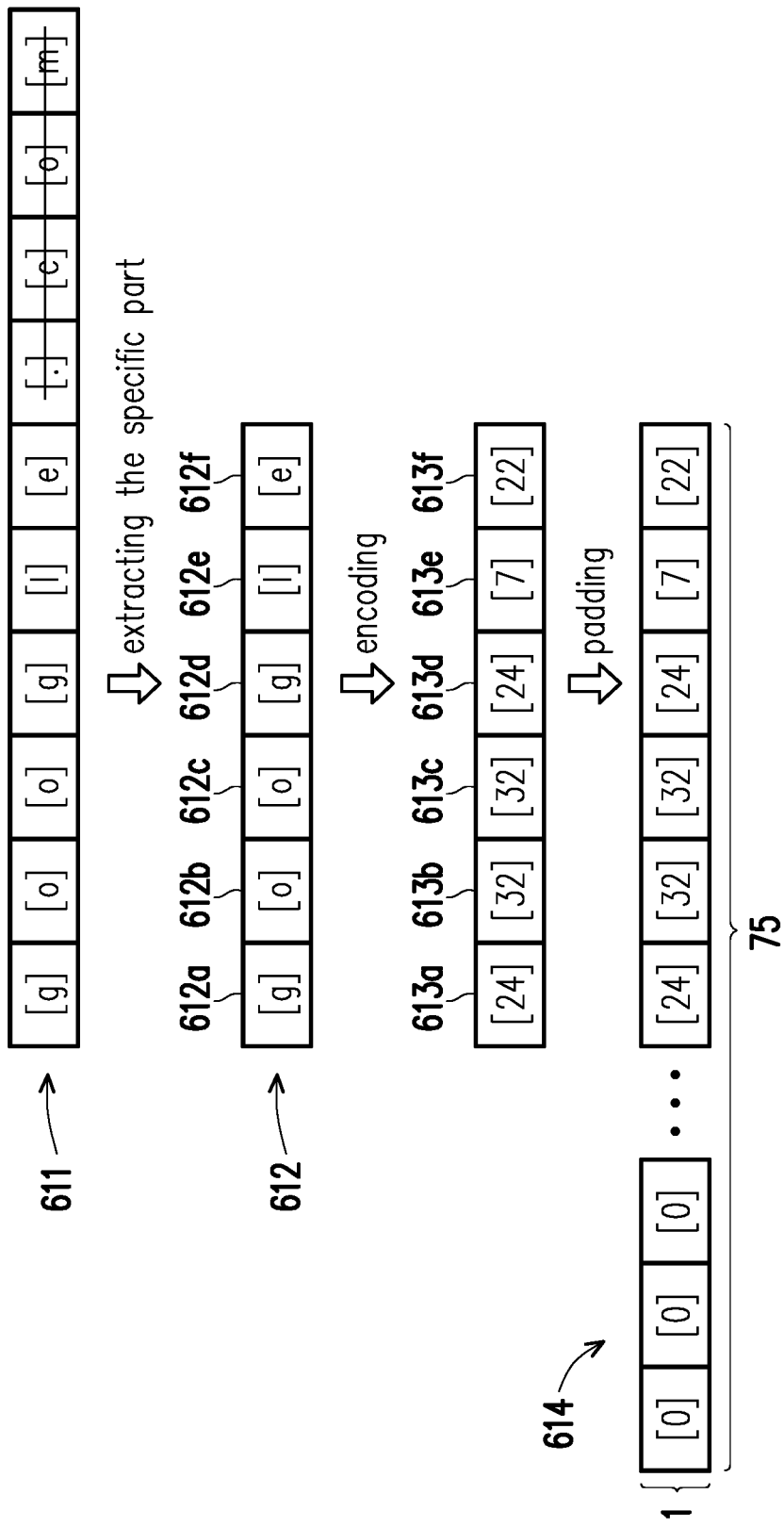
FIG. 6 is a schematic diagram of pre-processing the raw domain name according to an embodiment of the present disclosure.

In order to facilitate the illustration of the concept of the present disclosure, the following description is made with reference to FIG. 6, FIG. 7, FIG. 8, and FIG. 9, but it is only used as an example and is not intended to limit the possible embodiments of the present disclosure. Please refer to FIG. 6, which is a schematic diagram of pre-processing the raw domain name according to an embodiment of the present disclosure. In the embodiment of FIG. 6, the raw domain name 611 is, for example, "google.com". Correspondingly, the processor 404 can divide the raw domain name 611 into "google" (i.e., the specific part 612) and the ".com" part in step S510, and extract the specific part 612 in step S520.

As shown in FIG. 6, the specific part 612 includes characters 612a, 612b, 612c, 612d, 612e, and 612f. Accordingly, in step S530, the processor 404 can encode the characters 612a-612f into encoded data 613a, 613b, 613c, 613d, 613e, and 613f. Specifically, since multiple matrix multiplications in the operation of the neural network are required to obtain the most suitable weight among the nodes, the specific part 612 needs to be firstly encoded into the corresponding numbers through the step S530 and inputted to the subsequent LSTM models. In other embodiments, the designer can adjust the manner of encoding the characters into the encoded data based on requirements, and is not limited to the mechanism shown in FIG. 6.

Thereafter, in step S540, the processor 404 may pad the encoded data 613a-613f to a specific length (e.g., 75 characters). In particular, since different raw domain names have different lengths, and for facilitating the process of inputting the raw domain names to the subsequent LSTM model, the processor 404 may pad the encoded data 613a-613f to a length suitable for being inputted to the LSTM model. In this embodiment, the processor 404 can use zero-padding to pad the encoded data 613a-613f to 75 characters. That is, the processor 404 can calculate the difference (i.e., 59 characters) between the length of the encoded data 613a-613f (i.e., 6 characters) and a specific length (e.g., 75 characters) and prefix the encoded data 613a-613f with 59 specific numbers (i.e., 0), but the present disclosure is not limited thereto.

In other embodiments, the designer may also select other values as the specific length based on experience, as long as the selected specific length can cover most of the domain name length.

Thereafter, in step S550, the processor 404 can project the encoded data 614 being padded as a plurality of embedded vectors. Specifically, the LSTM model generally includes an embedded layer, an LSTM layer, and a fully-connected layer, and the step S550 is to establish the above embedded layer, and the details thereof will be explained with reference to FIG. 7.

Figure 7:
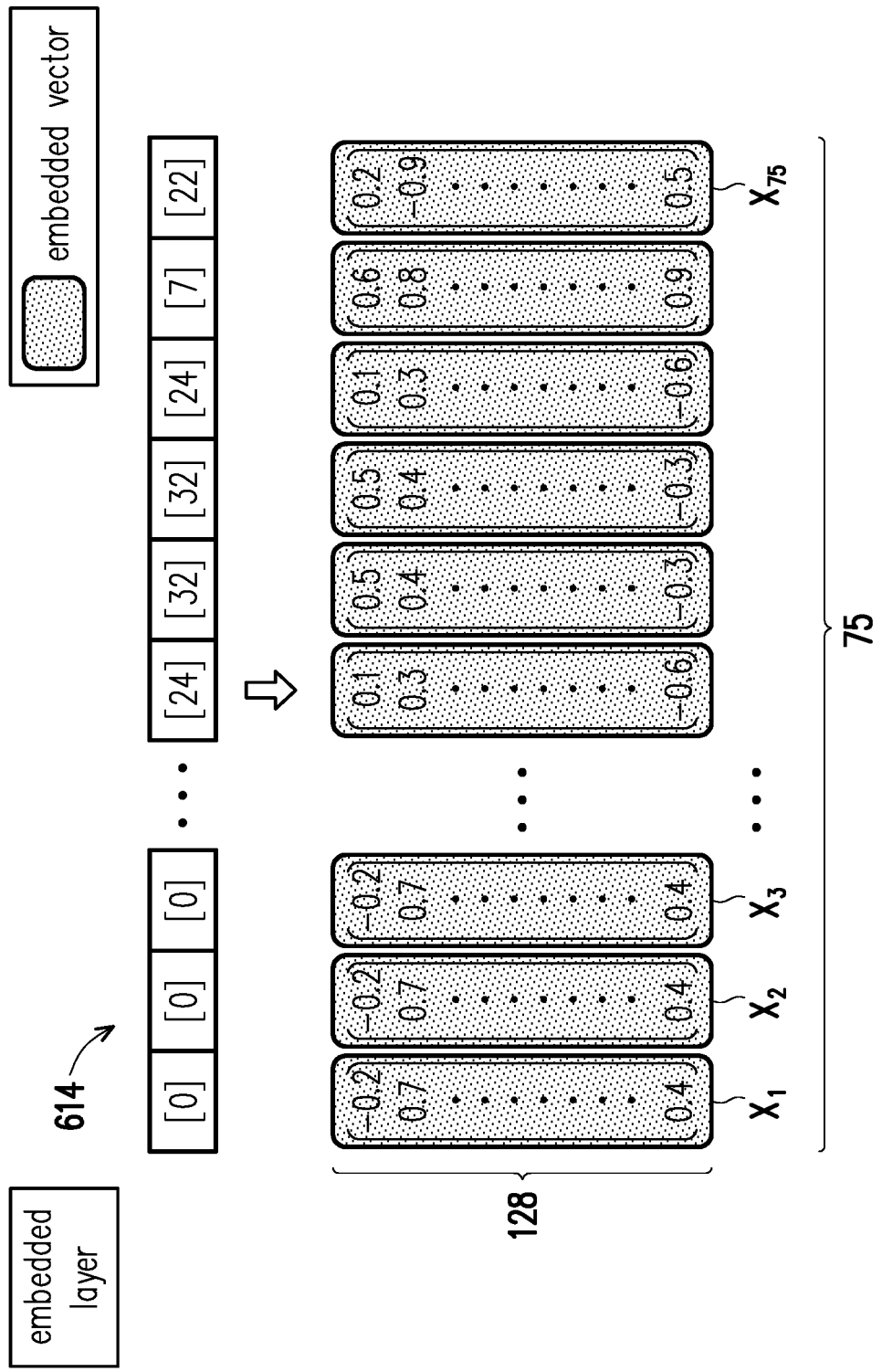
FIG. 7 is a schematic diagram of an embedded layer according to FIG. 6.

Please refer to FIG. 7, which is a schematic diagram of an embedded layer according to FIG. 6. In this embodiment, the encoded data 614 being padded can be projected by the processor 404 as 75 embedded vectors $X_1$-$X_{75}$, and the dimensions of each embedded vector are, for example, (128, 1). Specifically, for the j-th (j is an integer between 1 and 75) characters in the encoded data 614 being padded, the processor 404 may one-to-one project the j-th character to the j-th embedded vector (represented by the embedded vector $X_j$) of the 75 embedded vectors. Thereby, the difference between the embedded vectors can be utilized to distinguish between similar and distinct characters.

In other embodiments, the dimensions of each embedded vector may also be determined by the designer as a value greater than 36. Specifically, since the general domain name is composed of English letters (26 in total) and numbers (10 in total), as long as the dimension of the embedded vector is designed to be greater than 36, the difference among the characters can be shown, but the present disclosure is not limited thereto.

Next, in step S560, the processor 404 may sequentially input the embedded vectors $X_1$-$X_{75}$ to a plurality of cells in the LSTM model to generate a result vector, the details of which will be explained with reference to FIG. 8.

Figure 8:
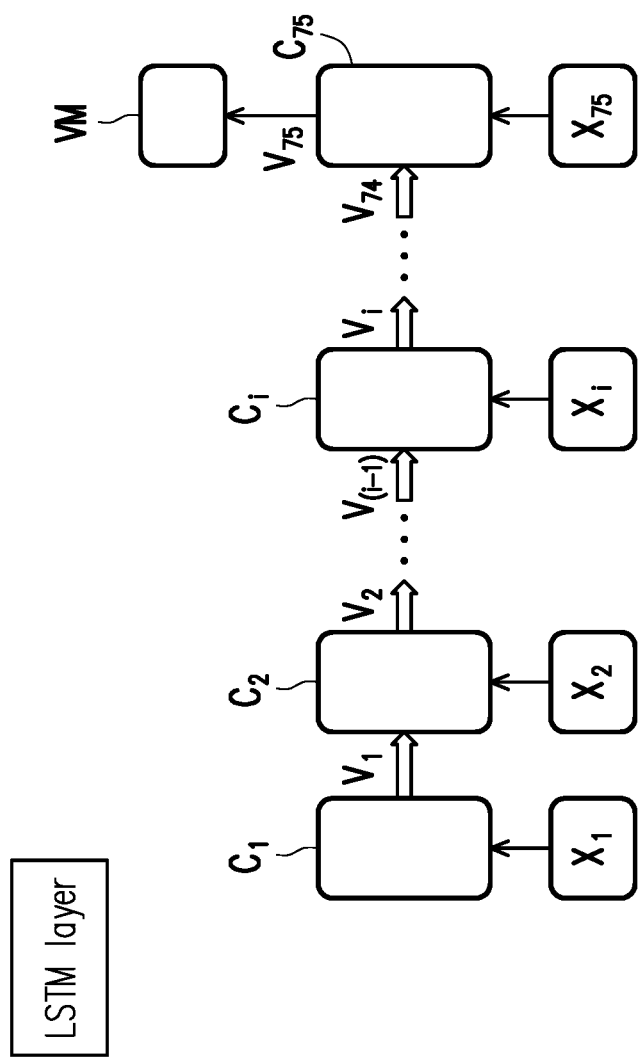
FIG. 8 is a schematic diagram of an LSTM layer according to FIG. 7.

Please refer to FIG. 8, which is a schematic diagram of an LSTM layer according to FIG. 7. In this embodiment, the LSTM layer may include a plurality of cells $C_1$-$C_{75}$ which are serially connected, wherein the structure of each cell may be implemented by using various known LSTM model cells, such as the architecture shown in FIG. 3, but may not be limited thereto.

For the i-th cell (represented by the cell $C_i$), it can receive the i-th embedded vector (i.e., the embedded vector $X_i$) of the embedded vectors and the output vector (denoted as $V_{(i-1)}$ of the (i-1)-th cell, and accordingly generates an output vector $V_i$ of the cell $C_i$, where i is between 2 and (N-1), and N is the total number of the aforementioned cells (i.e., 75).

Further, for the N-th cell of the foregoing cells (i.e., the cell $C_{75}$), it receives the N-th embedded vector (indicated by the embedded vector $X_{75}$) in the embedded vectors and the output vector (denoted as $V_{74}$) of the (N-1)-th cell, and accordingly generates the output vector (denoted as $V_{75}$) of cell $C_{75}$ as the result vector VM (which is, for example, a vector having the same dimension as each embedded vector, i.e., (128, 1)).

In brief, each embedded vector will be used as the input of the next cell after being processed by the corresponding cell, and will not be outputted until the cell $C_{75}$ has generated the output vector $V_{75}$ as the result vector VM.

Thereafter, in step S570, the processor 404 can convert the result vector into a prediction probability via the fully-connected layer and the specific function. In the present embodiment, the aforementioned specific function is, for example, a Sigmoid function, and the aforementioned prediction probability is, for example, the probability that the raw domain name 611 is generated by the DGA.

Figure 9:
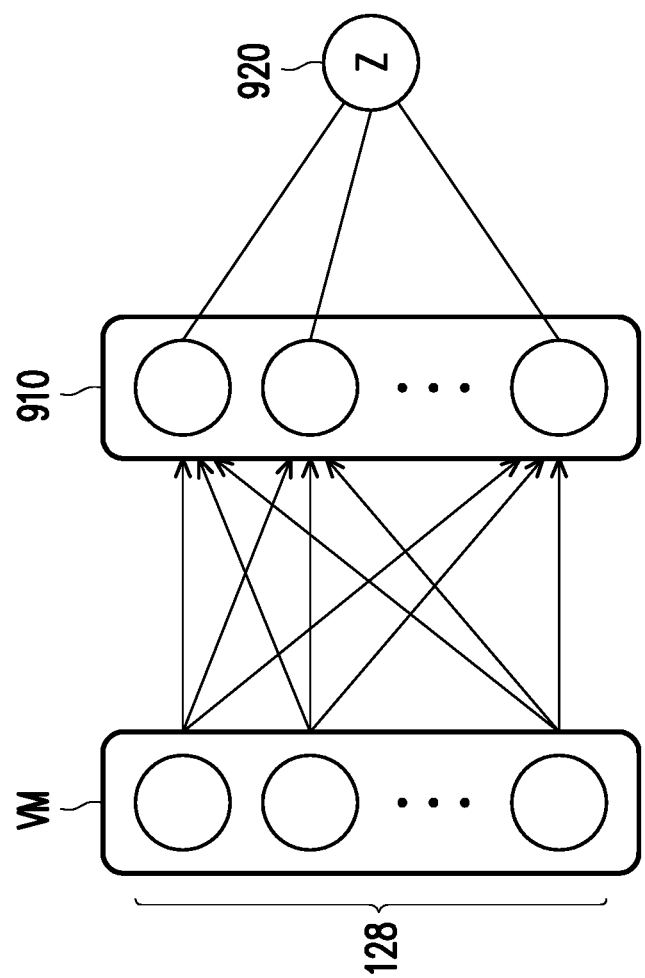
FIG. 9 is a schematic diagram of a fully-connected layer and a specific function according to FIG. 8.

Please refer to FIG. 9, which is a schematic diagram of a fully-connected layer and a specific function according to FIG. 8. In the present embodiment, the fully-connected layer 910 can map the result vector VM in FIG. 8 to the reference value Z, and the specific function 920 (e.g., the Sigmoid function) can be used to convert the reference value Z to a value between 0 and 1 to characterize the aforementioned prediction probability.

It can be understood from the above that the method for evaluating the domain name and the server using the same method proposed by the present disclosure can use the trained LSTM model to identify which domain name may be the domain name generated by the hacker using the DGA. In this way, the location of the Bot can be found during the incubation phase to avoid subsequent infection of more devices.

In an embodiment, the LSTM model described above can be trained via a mechanism similar to that of FIG. 5. Specifically, in order for the LSTM model to learn the features of the domain names generated by the DGA, the processor 404 may use the domain names known as the domain names generated by the DGA as the training data, and via the mechanism shown in 6, the training data can be converted to an aspect (e.g., the encoded data 614 being padded) suitable for feeding into an embedded layer. Thereafter, the features in the above training data can be extracted (or learned) via the embedded layer of FIG. 7 and the LSTM layer of FIG. 8.

As for the fully-connected layer, the difference from that shown in FIG. 9 is that the processor 404 can discard the weights of a part of entries in the result vector VM according to a certain dropout rate (for example, 0.5) in the training phase. Accordingly, the trained LSTM model may be less possible to have overfitting problems (e.g., only domain names with a small number of specific features can be identified).

As mentioned in the previous embodiments, the length (i.e., the aforementioned specific length) of the encoded data being padded can be determined by the designer based on requirements. However, in other embodiments, the aforementioned specific length may also be self-learned by the LSTM model during the training process. For example, if the LSTM model finds that all training data are less than 60 characters in length during training, the designer can adjust the specific length used accordingly, so that the processor 404 may reduce the number of the characters used for padding when padding the encoding data, but the present disclosure is not limited thereto.

In summary, the method for evaluating the domain name and the server using the same method proposed by the present disclosure can use the trained LSTM model to identify which domain name may be the domain name generated by the hacker using the DGA. In this way, the location of the Bot can be found during the incubation period to avoid subsequent infection of more devices and subsequent large-scale botnet attacks. In addition, it is also possible to find the real location of the C2 server by analyzing the IP addresses that are commonly connected behind these domain names, and then blacklist the IP addresses to avoid the user's device to be implanted with a new Bot again.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method of evaluating a domain name, comprising:
    retrieving a raw domain name and dividing the raw domain name into a plurality of parts by a processor;
    retrieving a specific part of the parts, wherein the specific part comprises at least one character by the processor;
    encoding the at least one character into at least one encoded data by the processor;
    padding the at least one encoded data to a specific length by the processor;
    projecting the encoded data being padded to a plurality of embedded vectors by the processor, wherein the at least one encoded data being padded one-to-one corresponds to the embedded vectors;
    sequentially inputting the embedded vectors to a plurality of cells of a long short term memory model to generate a result vector by the processor; and
    converting the resulting vector to a prediction probability by the processor via a fully-connected layer and a specific function,
    wherein the step of padding the at least one encoded data to the specific length comprises:
        calculating a difference between a length of the at least one encoded data and the specific length by the processor; and
        prefixing the at least one encoded data with at least one specific number by the processor, wherein a number of the at least one specific number is equal to the difference.

2. The method of claim 1, wherein the parts consist of a sub-level domain name, a generic top-level domain name, a country code top-level domain name, and the specific part.

3. The method of claim 1, wherein each of the encoded data is a number.

4. The method of claim 1, wherein the specific length is greater than 36.

5. The method of claim 1, wherein the cells are serially connected, and an i-th cell of the cells receives an i-th embedded vector of the embedded vectors and an output vector of an (i-1)-th cell and accordingly generates an output vector of the i-th cell, wherein i is between 2 and (N-1), and N is a total number of the cells.

6. The method of claim 5, wherein an N-th cell of the cells receives an N-th embedded vector of the embedded vectors and an output vector of an (N-1)-th cell, and accordingly generates an output vector of the N-th cell as the result vector.

7. The method of claim 1, wherein the specific function is a Sigmoid function, and the step of converting the resulting vector to the prediction probability via a fully-connected layer and a specific function comprises:
    mapping the result vector to a reference value through the fully-connected layer by the processor; and
    converting the reference value to the prediction probability by the Sigmoid function by the processor.

8. The method of claim 1, wherein the prediction probability represents a probability that the raw domain name is generated by a domain generation algorithm.

9. A server comprising:
    a storage circuit, storing a plurality of modules; and
    a processor, coupled to the storage circuit and accesses the modules to perform the following steps:
    retrieving a raw domain name and dividing the raw domain name into a plurality of parts;
    retrieving a specific part of the parts, wherein the specific part comprises at least one character;
    encoding the at least one character into at least one encoded data;
    padding the at least one encoded data to a specific length;
    projecting the encoded data being padded to a plurality of embedded vectors, wherein the at least one encoded data being padded one-to-one corresponds to the embedded vectors;
    sequentially inputting the embedded vectors to a plurality of cells of a long short term memory model to generate a result vector; and
    converting the resulting vector to a prediction probability via a fully-connected layer and a specific function,
    wherein the processor is configured to:
        calculate a difference between a length of the at least one encoded data and the specific length;
        prefix the at least one encoded data with at least one specific number, wherein a number of the at least one specific number is equal to the difference.

10. The server of claim 9, wherein the parts consist of a sub-level domain name, a generic top-level domain name, a country code top-level domain name, and the specific part.

11. The server of claim 9, wherein each of the encoded data is a number.

12. The server of claim 9 wherein the specific length is greater than 36.

13. The server of claim 9, wherein the cells are serially connected, and an i-th cell of the cells receives an i-th embedded vector of the embedded vectors and an output vector of an (i-1)-th cell and accordingly generates an output vector of the i-th cell, wherein i is between 2 and (N-1), and N is a total number of the cells.

14. The server of claim 13, wherein an N-th cell of the cells receives an N-th embedded vector of the embedded vectors and an output vector of an (N-1)-th cell, and accordingly generates an output vector of the N-th cell as the result vector.

15. The server of claim 9 wherein the specific function is a Sigmoid function and the processor is configured to:
   map the result vector to a reference value through the fully-connected layer; and
   convert the reference value to the prediction probability by the Sigmoid function.

16. The server of claim 9, wherein the prediction probability represents a probability that the raw domain name is generated by a domain generation algorithm.

* * * * *